United States Patent
Kildegaard

(10) Patent No.: US 7,162,979 B2
(45) Date of Patent: Jan. 16, 2007

(54) DEVICE AND METHOD FOR DRIVING ANIMALS IN AN OBLONG CORRIDOR SECTION

(75) Inventor: Jacob Kildegaard, Hellerup (DK)

(73) Assignee: Butina APS, Holbaek (DK)

( * ) Notice: Subject to any disclaimer, the term of this patent is extended or adjusted under 35 U.S.C. 154(b) by 81 days.

(21) Appl. No.: 10/508,984

(22) PCT Filed: Mar. 26, 2003

(86) PCT No.: PCT/DK03/00202

§ 371 (c)(1),
(2), (4) Date: Sep. 24, 2004

(87) PCT Pub. No.: WO03/079770

PCT Pub. Date: Oct. 2, 2003

(65) Prior Publication Data

US 2005/0161001 A1   Jul. 28, 2005

(30) Foreign Application Priority Data

Mar. 27, 2002   (DK) .............................. 2002 00466

(51) Int. Cl.
*A01K 1/00* (2006.01)
*A01K 15/02* (2006.01)

(52) U.S. Cl. ...................................... 119/843; 119/510

(58) Field of Classification Search ................ 119/843, 119/507, 510, 522, 502, 415, 425, 437, 444, 119/488, 506, 516, 523, 524, 840
See application file for complete search history.

(56) References Cited

U.S. PATENT DOCUMENTS

| | | | | | |
|---|---|---|---|---|---|
| 3,799,115 | A | * | 3/1974 | Fullerton et al. | 119/510 |
| 3,805,741 | A | * | 4/1974 | Thompson et al. | 119/510 |
| 3,921,586 | A | * | 11/1975 | Sweeney et al. | 119/510 |
| 4,445,460 | A | * | 5/1984 | Stencil | 119/510 |
| 5,009,191 | A | | 4/1991 | Joergensen et al. | |
| 5,622,141 | A | | 4/1997 | Lareva | |
| 6,209,492 | B1 | * | 4/2001 | Rankin | 119/843 |
| 6,601,536 | B1 | * | 8/2003 | Sprik | 119/60 |

FOREIGN PATENT DOCUMENTS

| | | |
|---|---|---|
| CS | 110525 | 4/1964 |
| EP | 0 920 807 | 6/1999 |
| FR | 2621345 A1 * | 4/1989 |

* cited by examiner

*Primary Examiner*—Son T. Nguyen
(74) *Attorney, Agent, or Firm*—Marshall, Gerstein & Borun LLP

(57) ABSTRACT

Device for driving animals in an oblong corridor section using a driving gate which can be moved from one end to the other of the corridor section. A first transport arrangement moves the driving gate in the corridor section in a longitudinal direction of the section, and moves the gate in the opposite direction after it has been brought outside the corridor section. A second transport arrangement pulls the gate sideways out from the corridor section in the plane of the gate through a gap in one side wall of the corridor section.

18 Claims, 4 Drawing Sheets

DEVICE AND METHOD FOR DRIVING ANIMALS IN AN OBLONG CORRIDOR SECTION

BACKGROUND

1. Field of Disclosure

Figure 1:
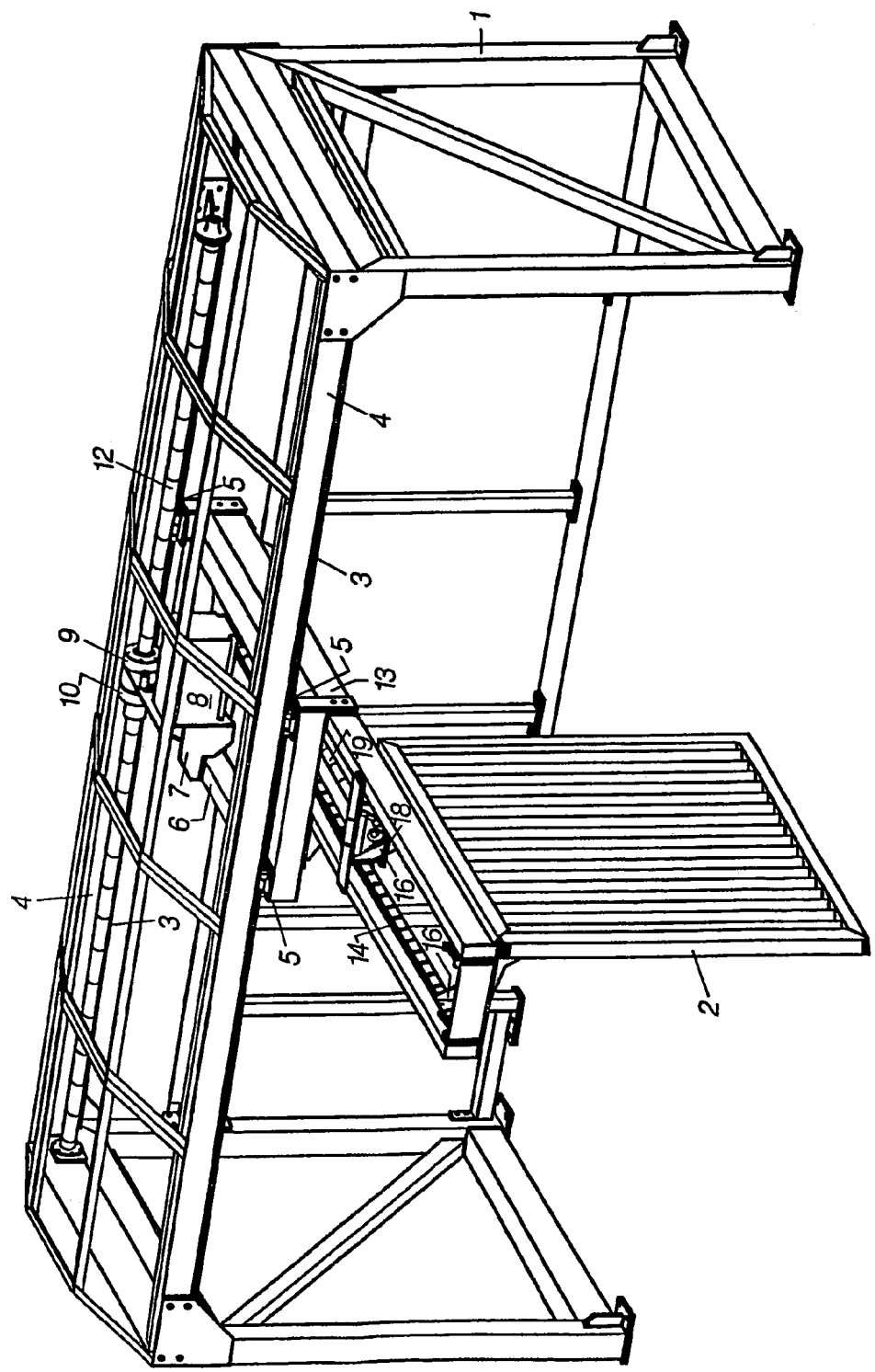

The present invention relates to a device and a method for driving animals in an oblong corridor section by means of a driving gate, which can be moved from one end of the corridor section to the other.

2. Description of the Prior Art

It is well known to use fully or semi-automatic driving gates to drive animals in a driving corridor, e.g. when slaughter pigs are driven from the pen area of a slaughterhouse to the stunning apparatus. For this purpose a travelling elevating gate can be used, which is a device that runs on rails placed on the topside of the side walls of the driving corridor and has an arrangement to lower a transverse gate into the corridor section between its side walls. A drawback by these gates is that animals, which are situated behind the travelling elevating gate, can become anxious when the travelling elevating gate is returning towards them or over them with the gate elevated.

Group wise stunning of slaughter pigs in $CO_2$ has gained a footing in slaughterhouses in recent years because of the lenient handling of the animals. A flock of animals is driven from the pen area of the slaughterhouse into a corridor in which the flock is divided into groups of a size, which corresponds to the box size of the stunning apparatus. The groups are driven one by one into the boxes of the stunning apparatus. It is essential that the animals remain relatively calm in these processes before they are stunned.

SUMMARY

It is the purpose of the present invention to provide a device for driving animals in an oblong corridor section, by which the animals remain relatively calm. The device should have a sturdy construction so that it will withstand any violent action from the animals.

The device according to the invention is characterized in that it comprises a first transport arrangement to move the driving gate in the longitudinal direction of the corridor section, from a first position at one end of the section to a second position at the other end, and to move the gate in the opposite direction after it has been brought outside the corridor section, from a position which is opposite the second position in the corridor section to a position which is opposite the first position in the corridor section, which first arrangement comprises a displaceable mounting part which can be moved in the longitudinal direction of the section over a distance corresponding to the distance between the first position and the second position of the gate, and that it comprises a second transport arrangement to draw the gate sideways out from the corridor section in the plane of the gate from the second position in the corridor section and to push the gate sideways into the corridor section in the plane of the gate from the position which is opposite the first position in the corridor section, which second arrangement comprises a second displaceable mounting part, to which the gate is fastened, and which can be moved transversely to the longitudinal direction of the section over a distance corresponding to at least the width of the driving gate.

A feature of the device according to the invention is that the driving gate is returned outside the driving corridor with the animals, so that the animals remain calm, as they do not pay attention to the gate during its returning.

The method according to the invention for driving animals in an oblong corridor section by means of a driving gate, which can be moved from one end to the other of the corridor section, is characterized in that a blockage, if present in the upstream end of the corridor section, is removed, that animals are driven into the corridor section through the upstream end, that the driving gate is pushed into the corridor section when a desired number of animals have passed into the section, from a position of the gate outside the section to a first position inside the section in its upstream end, that a blockage, if present in the downstream end of the corridor section, is removed, that the driving gate is moved to a second position in the corridor section in the downstream end, driving the animals out from the corridor section, that any blockage in the downstream end of the corridor section is re-established in front of the driving gate, that the driving gate is moved sideways to a position outside the corridor section, that the driving gate is returned outside the corridor section to the position opposite the first position in the corridor section, and that the process steps are repeated as required.

The device and method according to the invention are used especially for handling of slaughter pigs and sheep (incl. lambs), e.g. for driving these forwards in a driving corridor or in connection with division of a flock of animals of e.g. 15 individuals into groups of 7–8 or 5 animals, and driving-forwards of the groups to a $CO_2$-apparatus for group wise stunning. The device and method can also be used for handling of cattle, whereby as few as one individual can be handled at a time by animals weighing several hundred kg, as it may be appropriate to handle such big animals one by one when they are to be driven forwards and e.g. stunned in a stunning apparatus, but of course several heads of cattle can also be handled at a time. The stunning apparatus can be a $CO_2$-apparatus, an electric stunning apparatus or a shooting box.

The invention is described in further detail in the following with reference to the drawings, wherein

DESCRIPTION OF THE 1 VIEWS OF THE DRAWING

Figure 2:
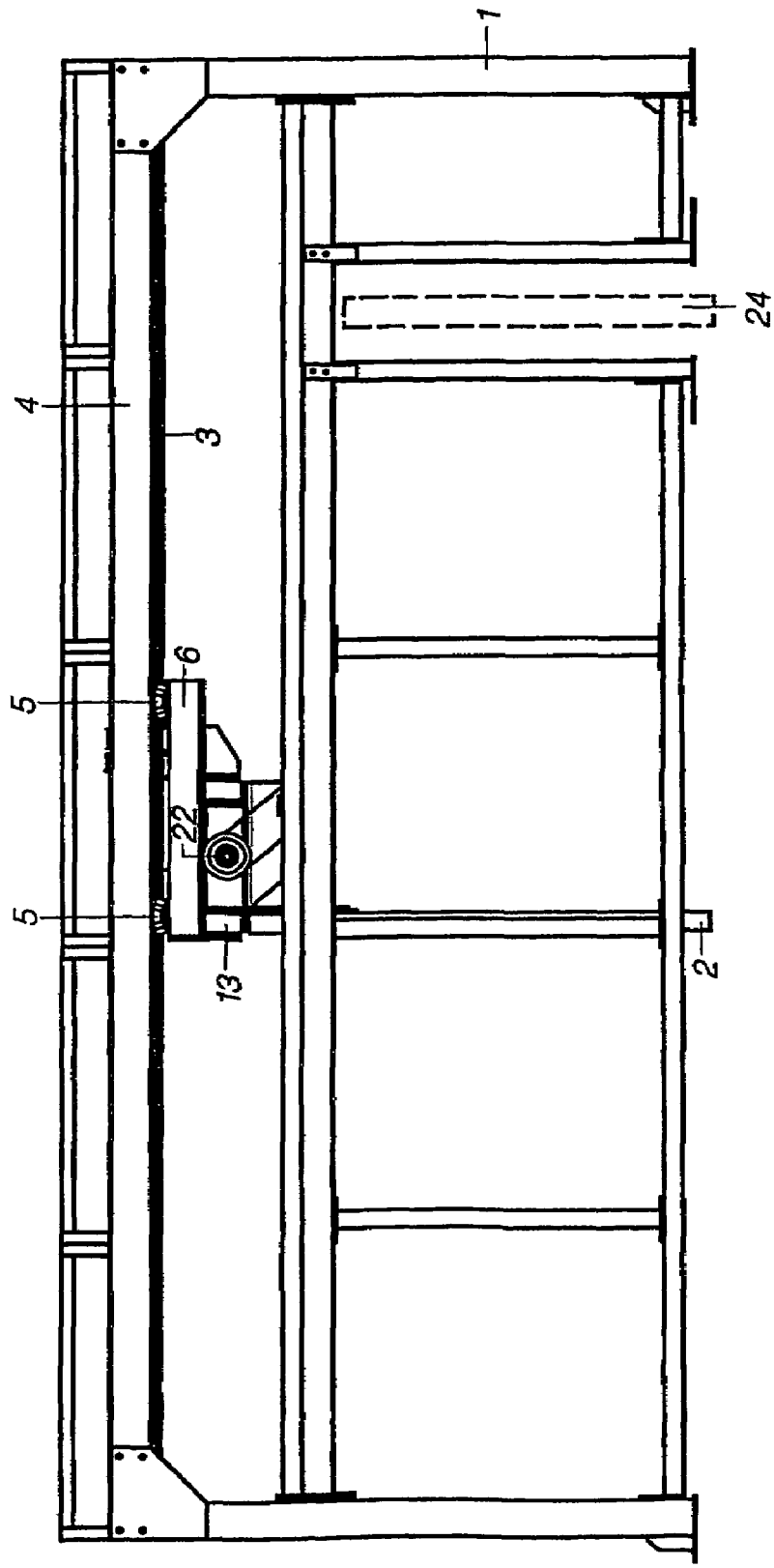
Figure 3:
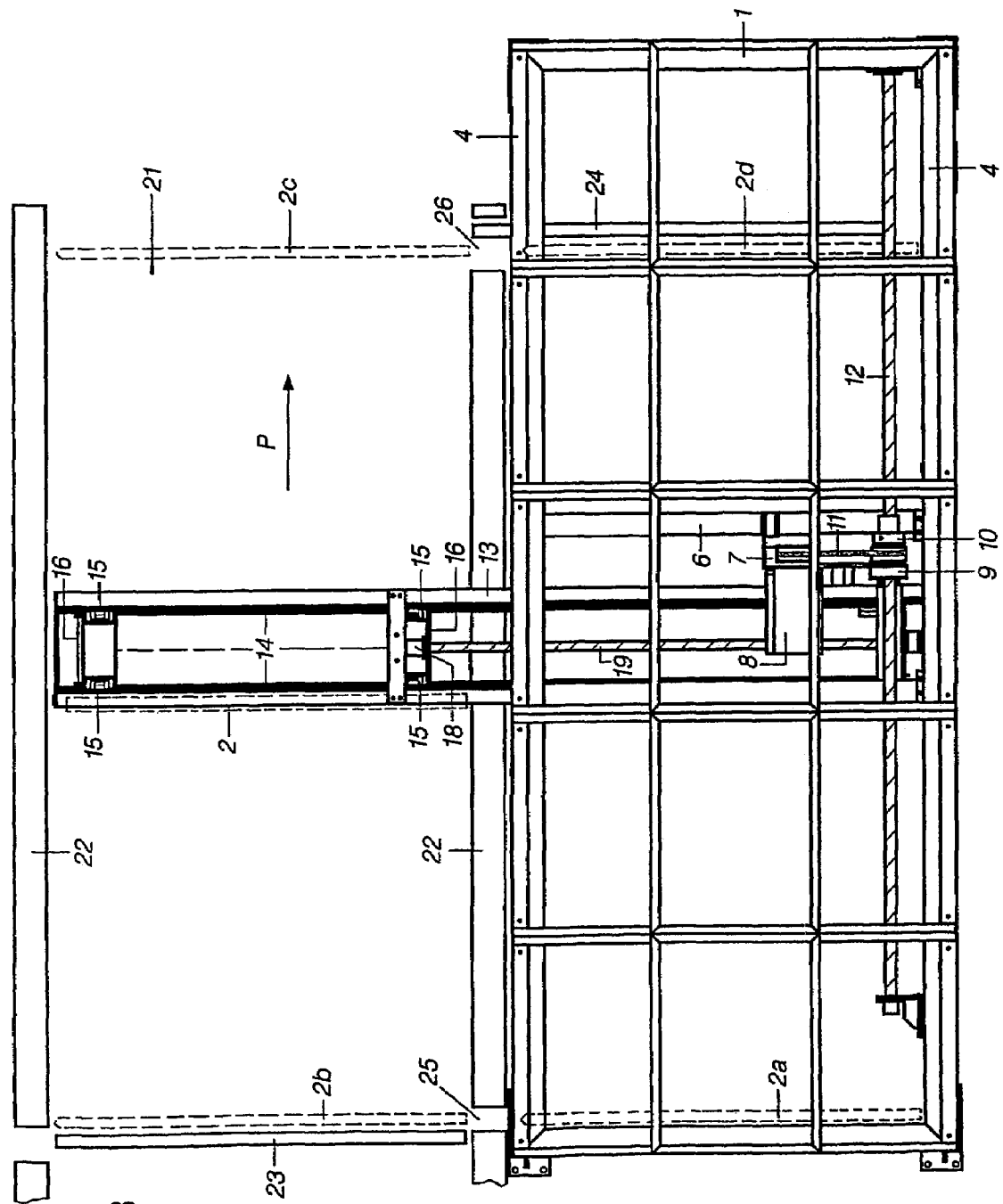
Figure 4:
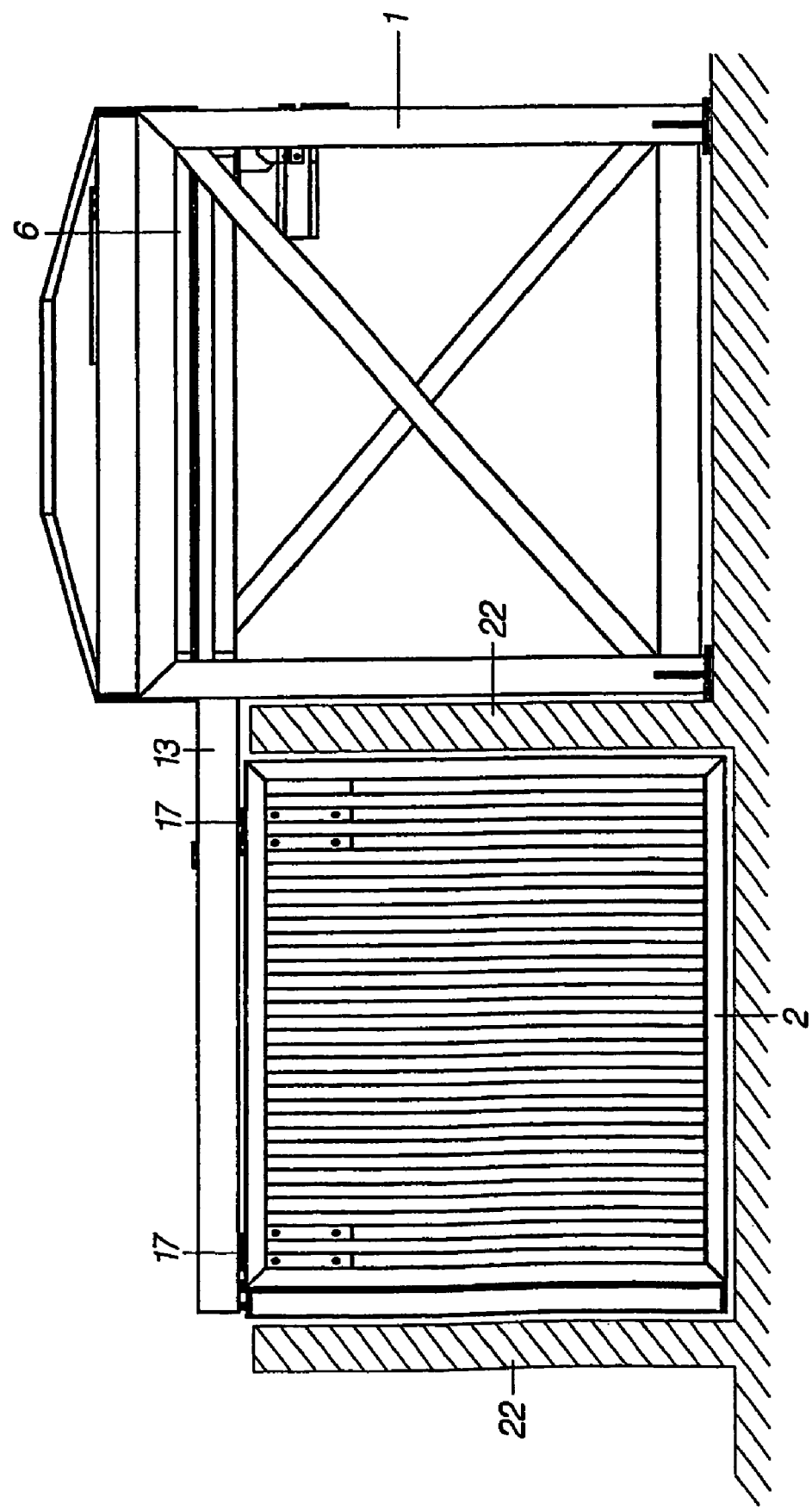

FIG. 1 shows a perspective view of an embodiment of the device according to the invention, FIG. 2 shows the device seen from the side, FIG. 3 shows the device seen from above together with a section of a driving corridor, and FIG. 4 shows the same as in FIG. 3, but seen in cross section.

DETAILED DESCRIPTION OF THE PREFERRED EMBODIMENTS

The device in FIGS. 1–4 comprises a rack 1, in which is mounted a first transport arrangement to move a driving gate 2 in a direction transversely to the plane of the gate, and a second transport arrangement to move the gate horizontally in the plane of the gate. The device is placed on the outside of a driving corridor for slaughter pigs as shown in FIGS. 3–4.

The transport arrangement to move the gate transversely to the plane of the gate comprises two guide rails 3 with I-profile. The rails are mounted on the underside of two longitudinal girders 4. Four ball guides 5, which grip the profile, can be moved along the guide rails 3 and are fastened in separate corners of a first mounting frame 6.

The mounting frame is provided with a bracket 7 for a motor 8 and a bearing 9, in which a spindle nut 10 can be turned by means of a toothed belt 11, which is connected to the shaft of the motor. The spindle nut 10 has an internal thread, which engages with a external thread on a longitudinal spindle 12, which is fastened in either end to the rack 1. When the motor turns the nut 10, the frame 6 with the motor 8 is driven in the longitudinal direction of the rack to one side or to the other, depending upon the rotation direction of the motor.

The second transport arrangement is mounted on the underside of the frame 6 and comprises a second frame 13, which is fastened to the frame 6. On the side of two square pipes, which constitute the long sides of the frame, there are two other guide rails 14 with I-profile. The rails have been turned 90°, so that their cross section has the shape of a lying "I". On the rails run four ball guides 15 of the same construction as the ball guides 5. The guides are connected with each other in pairs by means of transverses 16. The transverses have a flange 17 to one side, on which the gate 2 is fastened, so that the gate connects the two transverses. One of the transverses 16 has a fixed spindle nut 18 with internal thread. The thread co-operates with the external thread on a spindle 19, which is movably mounted in a bearing in the opposite end of the nut 18 and can be turned by means of a motor which is fastened to the second frame 13, a gear wheel 20 on one end of the spindle being actuated by a toothed belt which is driven by the motor. When the motor turns the spindle, the ball guides 15 with the transverses 16 and gate 2 are displaced in the longitudinal direction of the frame 13, i.e. horizontally in the plane of the gate.

The device comprises a control unit, which determines the pattern of movement of the gate by activation of one or the other transport arrangement, respectively. The device is designed to move the gate in a rectangular pattern, seen from above, i.e. only one transport arrangement is activated at a time.

More specifically, the device is designed to co-operate with a section 21 of a driving corridor with side walls 22 and two sliding gates 23 and 24, of which the latter is mounted in the rack 1. The gate 2 of the device is moved into the section 21 in front of a closed sliding gate 23 through a gap 25 in one side wall of the corridor section. The gate 2 is then moved in the direction of the arrow P to a position by the sliding gate 24, driving animals in the section in front of it. It is returned to a position outside the driving corridor through a second gap 26 in the wall, and finally the gate is returned to the starting position.

The device can e.g. be used in connection with division of a flock of animals into groups, which are to be transferred to a stunning apparatus for group wise stunning. In the Danish patent application PA 2002 00465 "Arrangement and method for division of animals into groups and transfer of groups of animals to stunning apparatus" (Slagteriernes Forskningsinstitut) the design and the functioning of a division system is described in further detail. The present device can be part of said system. Some of the functions of the system are described below in connection with FIG. 3.

From the pen area of the slaughterhouse a flock of animals of approx. 15 slaughter pigs are driven into a driving corridor and from there into a corridor area to the left of the sliding gate 23, which is closed, if the corridor section 21 is not ready to receive animals. When the corridor section is ready, the sliding gate 23 is opened partially, to allow one animal at a time to pass into the section. The animals are driven forwards and into the corridor section by means of a travelling elevating gate in the corridor area to the left of the sliding gate 23.

When a group of 7–8 individuals have come into the corridor section 21, which is closed in the far end by the sliding gate 24, the sliding gate 23 is completely closed. The travelling elevating gate stops to avoid squeezing of the animals. There is now a group of animals in section 21 and a group of animals in the area to the left of the sliding gate 23.

The travelling sliding gate is moved from a position 2a to a position 2b inside the driving corridor by means of the second transport arrangement. When the area to the right of the sliding gate 24 is ready to receive a group of animals, the sliding gate 24 will be opened and the travelling sliding gate 2 is moved forwards in the corridor section 21 by means of the first transport arrangement, causing the group of animals to walk/be driven into the area to the right of the sliding gate 24. The travelling sliding gate stops immediately by the sliding gate 24 in position 2c. The sliding gate 24 is closed and the travelling sliding gate 2 is moved, by means of the second transport arrangement, to a position 2d outside the driving corridor and further returned to the position 2a again by means of the first transport arrangement. From the area to the right of the sliding gate 24 the group of animals is driven by means of a movable wall into a stunning apparatus for group wise stunning.

As soon as the travelling sliding gate during these processes has been moved into the driving corridor to position 2b, the sliding gate 23 can be opened completely, so that the group of the remaining animals in the area to the left of the sliding gate 23 can walk into the corridor section 21 as the travelling sliding gate makes this available by the movement from position 2b to position 2c. The travelling elevating gate in the corridor to the left of the gate 23 is started again, so that the animals are driven all the way into the corridor section 21. The travelling elevating gate stops close to the sliding gate 23, which is closed, whereby the remaining animals has been isolated in the section 21. The travelling elevating gate is returned in the corridor area to the left of the gate 23 in order to drive forwards a new flock of animals towards the section 21.

The gate 2 is pushed into the corridor section behind the isolated group of animals in the section 21 to position 2b. When the area to the right of the gate 24 is ready to receive the animals, the gate 24 will be opened and the gate 2 is moved forwards towards position 2c, so that the animals are driven into the area. When the gate has reached position 2c, the sliding gate 24 will be closed and the gate 2 is moved out of the driving corridor to position 2d and from there to position 2a. The processes can then be repeated with a new flock of animals, which have been driven into the area to the left of the gate 23, and which can already start walking into the section 21 when the driving gate begins to drive the last animals from the first flock into the area to the right of the gate 24.

The invention is claimed:

1. Device for driving animals in an oblong corridor section (21), the device comprising:
   a driving gate (2) adapted to be moved from one end of the corridor section to the other;

a first transport arrangement (3, 5, 10, 12) adapted to move the driving gate (2) in the corridor section in a longitudinal direction of the corridor section from a first position (2b) at one end of the corridor section to a second position (2c) at the other end and to move the gate (2) in the opposite direction after it has been brought outside the corridor section, from a third position (2d) which is opposite the second position (2c) in the corridor section, to a fourth position (2a) which is opposite the first position (2b) in the corridor section, the first arrangement comprising a first displaceable mounting part (6), which can be moved in the longitudinal direction of the corridor section over a distance corresponding to the distance between the first position (2b) and the second position (2c) of the gate; and a second transport arrangement (13, 14, 18, 19) adapted to pull the gate sideways out from the corridor section in the plane of the gate from the second position (2c) in the corridor section to the third position, and to push the gate sideways into the corridor section in the plane of the gate from the fourth position (2a) to the first position (2b) in the corridor section, the second arrangement comprising a second displaceable mounting part (16), to which the gate (2) is fastened and which is adapted to be moved transversely to the longitudinal direction of the corridor section over a distance corresponding to at least a width of the driving gate (2).

2. Device according to claim 1, wherein the second transport arrangement is suspended in the mounting part (6) of the first transport arrangement.

3. Device according to claim 1, wherein the first transport arrangement has at least two guiding surfaces (3), which are parallel to each other and extend in the longitudinal direction of the section, along which guiding surfaces the first displaceable mounting part (6) can be displaced.

4. Device according to claim 1, wherein the first transport arrangement comprises a motor (8) adapted to move the first displaceable mounting part (6) in the longitudinal direction of the corridor section.

5. Device according to claim 4, wherein the first transport arrangement comprises an oblong element (12), which extends in the longitudinal direction of the corridor section, and wherein the motor operates a coupling device (10), the coupling surfaces of which engage with surfaces on the oblong element (12).

6. Device according to claim 1, wherein the second transport arrangement comprises a motor adapted to move the second displaceable mounting part (16) with the gate (2) transversely to the longitudinal direction of the corridor section.

7. Device according to claim 6, wherein the second transport arrangement comprises an oblong element (19), which extends transversely to the longitudinal direction of the corridor section and has surfaces to engage with coupling surfaces of a coupling device (18) on the second displaceable mounting part (16), and wherein the driving shaft of the motor can rotate the oblong element (19).

8. Device according to claim 1, wherein the second transport arrangement has at least two guiding surfaces (14), which are parallel to each other and extend transversely to the longitudinal direction of the corridor 1, along which guiding surfaces the second displaceable mounting part (16) with gate can be displaced.

9. Device according to claim 1, further comprising a control unit which coordinates the movement of the first and second transport arrangements.

10. Device according to claim 9, wherein the control unit is designed to co-ordinate the operation of motors in the first and second transport arrangements.

11. Device according to claim 1, wherein the driving gate (2) is mainly plane.

12. Device according to claim 1, wherein the corridor section (21) comprises a side wall (22) on each longitudinal side thereof.

13. Device according to claim 12, wherein one side wall (22) has a first gap (26) through which the driving gate (2) can be pulled sideways out from the corridor section and a second gap (25) through which the gate (2) can be pushed sideways into the corridor section, and wherein the second displaceable mounting part (16) can be moved over a distance corresponding to the width of the gate (2) and a thickness of the side wall, together.

14. Device according to claim 1, further comprising a gate (24) which is placed at the second position (2c) of the driving gate (2) on the down-stream side of th position (2c) in relation to the driving direction.

15. Device according to claim 1, further comprising a gate (23) at the first position (2b) of the driving gate (2) on the up-stream side of the position (2b), which gate can be opened partially to a position which allows animals to walk one at a time through the passage formed by the opening process, and wherein the gate (23) can also be opened completely to form an opening of the same width as the corridor section, which opening allows several animals to be driven forwards next to each other.

16. Device according to claim 15, further comprising a control unit which coordinates the movement of the first and second transport arrangements and controls the opening of the gate (23).

17. Device according to claim 1, further comprising two gates (23, 24), which are placed at the first and second position. (2b, 2c) of the driving gate (2), on either side of the corridor section and which are operated by the driving gate (2) when it is moved from the first position to the second position.

18. Device according to claim 17, further comprising a control unit which coordinates the movement of the first and second transport arrangements and controls the opening of the gates (23, 24).

* * * * *

UNITED STATES PATENT AND TRADEMARK OFFICE
CERTIFICATE OF CORRECTION

PATENT NO. : 7,162,979 B2
APPLICATION NO. : 10/508984
DATED : January 16, 2007
INVENTOR(S) : Jacob L. Kildegaard It is certified that error appears in the above-identified patent and that said Letters Patent is hereby corrected as shown below:

At Column 5, line 5, "end and" should be -- end, and --.

At Column 5, line 8, "(2$d$) which" should be -- (2$d$), which --.

At Column 5, line 21, "(2$a$)to" should be -- (2$a$) to --.

At Column 6, line 4, claim 8, "corridor 1" should be -- corridor section --.

At Column 6, line 28, claim 14, "of th position" should be -- of the position --.

At Column 6, line 45, claim 16, "position. (2$b$, 2$c$)" should be -- positions (2$b$, 2$c$) --.

Signed and Sealed this

Fourteenth Day of August, 2007

JON W. DUDAS
*Director of the United States Patent and Trademark Office*